United States Patent
Nieslony et al.

(10) Patent No.: US 7,290,559 B2
(45) Date of Patent: Nov. 6, 2007

(54) CHECK VALVE FOR A HIGH-PRESSURE PUMP OF A FUEL INJECTION SYSTEM FOR AN INTERNAL COMBUSTION ENGINE

(75) Inventors: Markus Nieslony, Salach (DE); Alfons Schoetz, Ditzingen (DE); Matthias Distel, Ostfildern (DE); Achim Koehler, Ditzingen (DE); Falko Bredow, Remseck (DE); Waldemar Kiel, Gerlingen (DE); Jochen Aleker, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 295 days.

(21) Appl. No.: 10/537,544

(22) PCT Filed: Apr. 8, 2004

(86) PCT No.: PCT/DE2004/000741

§ 371 (c)(1),
(2), (4) Date: Jun. 3, 2005

(87) PCT Pub. No.: WO2004/109093

PCT Pub. Date: Dec. 16, 2004

(65) Prior Publication Data
US 2006/0039811 A1 Feb. 23, 2006

(30) Foreign Application Priority Data
May 22, 2003 (DE) ............... 103 23 147
Oct. 6, 2003 (DE) ............... 103 46 211

(51) Int. Cl.
*F16K 15/06* (2006.01)
*F02M 59/46* (2006.01)
*F04B 53/10* (2006.01)

(52) U.S. Cl. .................. 137/454.4; 137/454.5; 137/542; 137/809

(58) Field of Classification Search ............ 137/454.4, 137/454.5, 540, 542, 809, 812; 417/559, 417/569
See application file for complete search history.

(56) References Cited

U.S. PATENT DOCUMENTS 620,936 A * 3/1899 Kunzer .................... 137/542

(Continued)

FOREIGN PATENT DOCUMENTS

AU    417351    9/1971

(Continued)

*Primary Examiner*—John Rivell
(74) *Attorney, Agent, or Firm*—Ronald E. Greigg

(57) ABSTRACT

A check valve having a valve housing inserted into a receptacle in which housing a pistonlike valve member is guided longitudinally displaceably and cooperating with a valve seat on the valve housing. The valve member is urged in the closing direction by a prestressed closing spring and in the opening direction by the pressure prevailing in an inlet, and the valve member is inserted into the valve housing from the side of the valve seat. The valve housing is embodied in one piece and is embodied as cup-shaped and has both a bottom and a jacket region that defines a recess. With the open end of its recess, the valve housing points out of the receptacle, and the valve seat is located on the bottom of the valve housing, facing away from the recess. With a shaft, the valve member protrudes through a bore in the bottom into the recess in which the closing spring is located.

12 Claims, 3 Drawing Sheets

U.S. PATENT DOCUMENTS

| | | | | |
|---|---|---|---|---|
| 653,860 | A | * | 7/1900 | Bulkley .................... 137/454.4 |
| 688,392 | A | * | 12/1901 | Conrad .................... 137/454.4 |
| 1,050,048 | A | * | 1/1913 | Zimmer .................... 137/454.4 |
| 1,105,134 | A | * | 7/1914 | Hanemann .................. 137/540 |
| 1,229,571 | A | * | 6/1917 | Barker .................... 137/454.4 |
| 1,554,683 | A | * | 9/1925 | Mount, Jr. et al. ....... 137/454.5 |
| 4,084,609 | A | * | 4/1978 | Johnson ..................... 137/542 |
| 5,172,720 | A | * | 12/1992 | Richards .................. 137/454.5 |
| 6,224,350 | B1 | * | 5/2001 | Guentert et al. ......... 137/454.4 |
| 6,332,761 | B1 | | 12/2001 | Guentert et al. |
| 6,345,608 | B1 | | 2/2002 | Rembold et al. |
| 6,558,142 | B2 | | 5/2003 | De Matthaeis |
| 2003/0099563 | A1 | * | 5/2003 | Utsumi ....................... 417/570 |

FOREIGN PATENT DOCUMENTS

| | | |
|---|---|---|
| DE | 197 44 577 A1 | 4/1999 |
| EP | 1 411 283 A2 | 4/2004 |

* cited by examiner

CHECK VALVE FOR A HIGH-PRESSURE PUMP OF A FUEL INJECTION SYSTEM FOR AN INTERNAL COMBUSTION ENGINE

CROSS-REFERENCE TO RELATED APPLICATIONS

This application is a 35 USC 371 application of PCT/DE 2004/000741 filed on Apr. 8, 2004.

BACKGROUND OF THE INVENTION

1. Field of the Invention

The invention is directed to an improved check valve, in particular for a high-pressure pump of a fuel injection system for an internal combustion engine.

2. Description of the Prior Art

One check valve known from German Patent Disclosure DE 197 44 577 A1 is inserted into a bore in the high-pressure pump and has a pistonlike valve member which cooperates with a valve seat in order to control the inflow of fuel into a pump work chamber of the high-pressure pump. The check valve has a multi-part valve housing, and the valve member is guided displaceably in a first part of the valve housing. The valve member is urged in the closing direction toward the valve seat by a prestressed closing spring and is urged in the opening direction away from the valve seat by the pressure prevailing in the fuel inlet. The valve member is inserted from the side of the valve seat into the first part of the housing and protrudes into a recess of an adjacent second part of the valve housing, in which the closing spring is located. The first part of the valve housing having the valve member and the closing spring is inserted into the bore of the high-pressure pump, and the second part of the valve housing is then inserted into the bore in order to fix the first part of the valve housing in the bore. Because of the two parts of the valve housing, the check valve has a complicated construction, and because of their separate installation it also requires major effort and assembly.

SUMMARY AND ADVANTAGES OF THE INVENTION

The check valve of the invention has the advantage over the prior art that because of its one-piece valve housing, it is constructed simply and is simple to install.

Advantageous features and refinements of the check valve of the invention are disclosed. One embodiment makes a relief of the recess of the valve housing and thus fast closure of the check valve possible, while another embodiment makes a flow through the check valve with only slight losses possible.

BRIEF DESCRIPTION OF THE DRAWINGS

The invention is more fully described herein below, in conjunction with the drawings, in which.

DESCRIPTION OF THE PREFERRED EMBODIMENT

Figure 1:
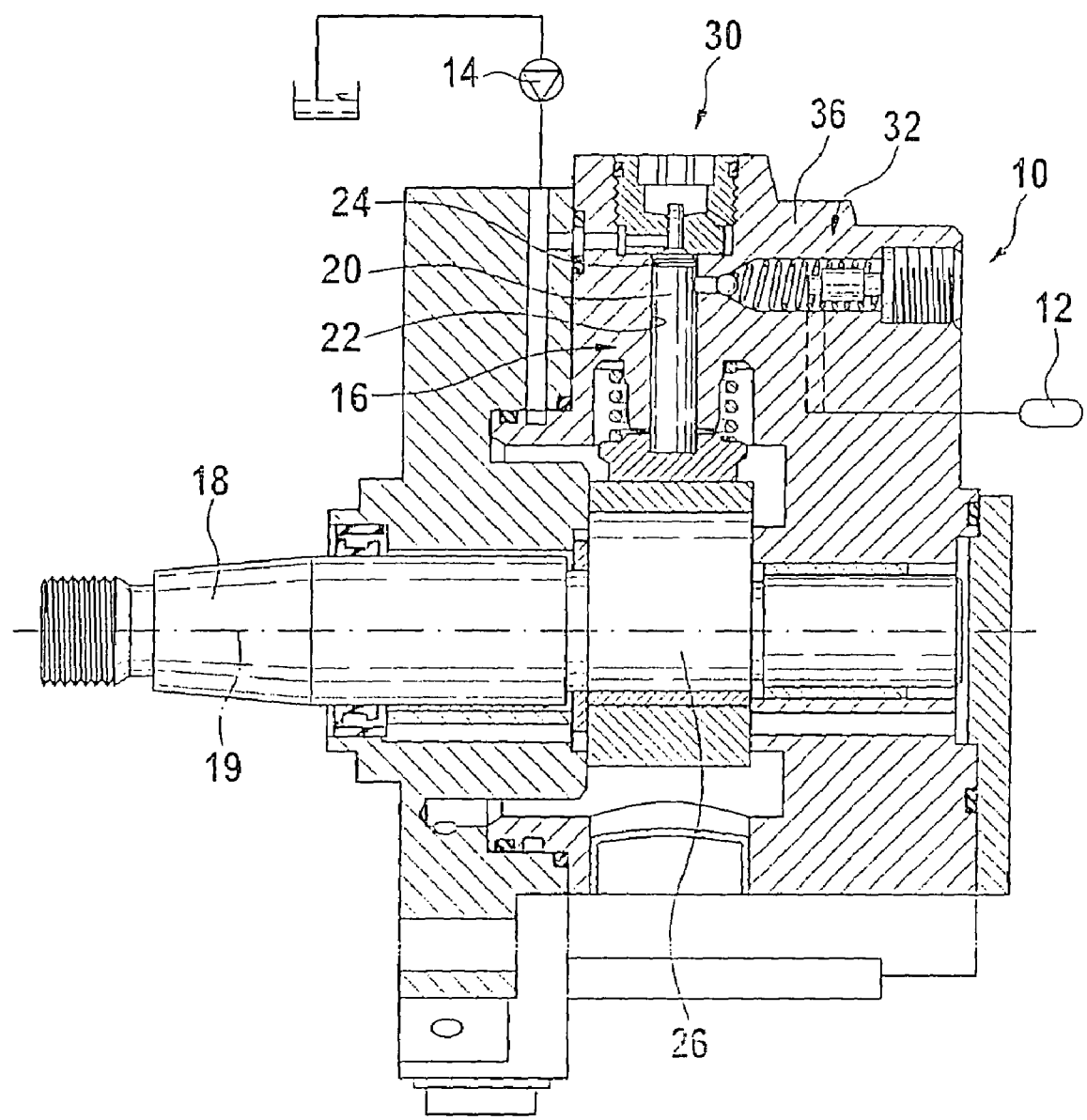
FIG. 1 shows a high-pressure pump for a fuel injection system of an internal combustion engine.

In FIG. 1, a high-pressure pump 10 for a fuel injection system of an internal combustion engine is shown, the engine preferably being a self-igniting engine. By means of the high-pressure pump 10, fuel is pumped at high pressure into a reservoir 12, from which fuel is withdrawn for injection to the engine. The high-pressure pump 10 is supplied with fuel by a feed pump 14. The high-pressure pump 10 has at least one pump element 16, which has a pump piston 20 driven at least indirectly by a drive shaft 18 of the high-pressure pump 10 in a reciprocating motion. The pump piston 20 is guided tightly in a cylindrical bore 22 extending at least approximately radially to the drive shaft 18 and, in the outer end region of the cylindrical bore 22 facing away from the drive shaft 18, the pump piston defines a pump work chamber 24. The drive shaft 18 has a cam or a shaft portion 26 that is eccentric to its axis of rotation 19, by way of which portion the reciprocating motion of the pump piston 20 is accomplished upon the rotary motion of the drive shaft 18. The pump work chamber 24 can be made to communicate with a fuel inlet from the feed pump 14 via an inlet valve 30 that opens into the pump work chamber 24 and is embodied as a check valve. The pump work chamber 24 can moreover be made to communicate with a fuel outlet to the reservoir 12, via an outlet valve 32, embodied as a check valve, that opens out of the pump work chamber 24. In the intake stroke, the pump piston 20 moves radially inward in the cylindrical bore 22, so that the volume of the pump work chamber 24 is increased. In the intake stroke of the pump piston 20, because of the existing pressure difference, the inlet valve 30 is opened, because the feed pump 14 generates a higher pressure than the pressure prevailing in the pump work chamber 24, and so fuel pumped by the feed pump 14 is aspirated into the pump work chamber 24. The outlet valve 32 is closed upon the intake stroke of the pump piston 20, since a higher pressure prevails in the reservoir 12 than in the pump work chamber 24.

The inlet valve 30 will now be described in further detail in conjunction with FIGS. 2 through 4. The inlet valve 30 is inserted into a bore 34, radially outwardly adjoining the cylindrical bore 22, of a housing part 36 of the high-pressure pump 10. The bore 34 is embodied with a larger diameter than the cylindrical bore 22. The housing part 36 may for instance be a cylinder head, which is connected to another housing part in which the drive shaft 18 is supported, or a housing part in which the drive shaft 18 is also supported. A fuel inlet conduit 38 which communicates with the feed pump 14 discharges into the bore 34, for instance approximately radially to the axis of the bore 34, near the end region of the bore toward the cylindrical bore 22. The inlet valve 30 has a one-piece valve housing 40, which is embodied as cup-shaped. The valve housing 40 has a jacket region, which defines a recess 41, and a bottom 42 adjoining the jacket region. The valve housing 40 points outward with the open end of its recess 41. With its bottom 42, the valve housing 40 points inward toward the cylindrical bore 22, and a bore 44 is made, with its longitudinal axis 45 at least approximately coaxial to the cylindrical bore 22, in the bottom 42. Toward the cylindrical bore 22, the bore 44 has a portion 44a of large diameter, and toward the recess 41 of the valve housing 40 it has a portion 44b of smaller diameter. At the mouth of the bore portion 44a toward the cylindrical bore 22, there is a valve seat 48, for instance embodied approximately conically. The valve housing 40 may for instance be embodied as a forged part, into which the bore 44 is made after the forging and the valve seat 48 is made.

At least one inlet conduit 50 extending at least approximately perpendicular to the longitudinal axis 45 of the bore 44 is made in the bottom 42 of the valve housing 40, and this inlet conduit discharges on one end at the outer jacket of the bottom 42 and on the other in the bore portion 44a. Preferably a plurality of inlet conduits 50, for instance three, distributed uniformly over the circumference of the valve housing 40 are provided. The inlet conduits 50 discharge into the bore portion 44a in such a way that their longitudinal axes 51 do not intersect the longitudinal axis 45 of the bore portion 44a, and the inlet conduits 50 discharge at least approximately at a tangent into the bore portion 44a, as shown in FIG. 3. In the region of the bottom 42, the valve housing 40 has a somewhat reduced diameter, so that an annular chamber 52 is formed between the outer jacket of the bottom 42 and the bore 44. The inlet conduit 38 and the inlet conduits 50 in the bottom 42 discharge into the annular chamber 52. At least one bore 54 which connects the recess 41 of the valve housing 40 with the annular chamber 52 is made in the jacket of the valve housing 40.

Figure 2:
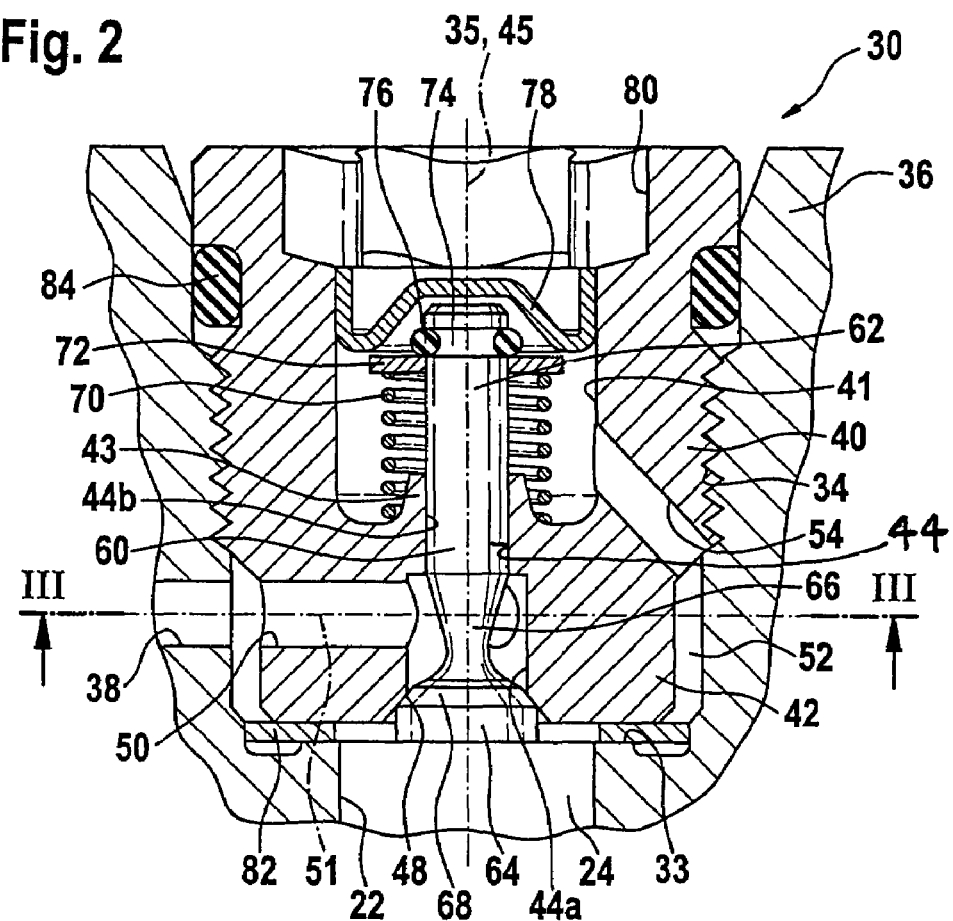
FIG. 2 shows a check valve of the high-pressure pump in an enlarged view in longitudinal section.
Figure 3:
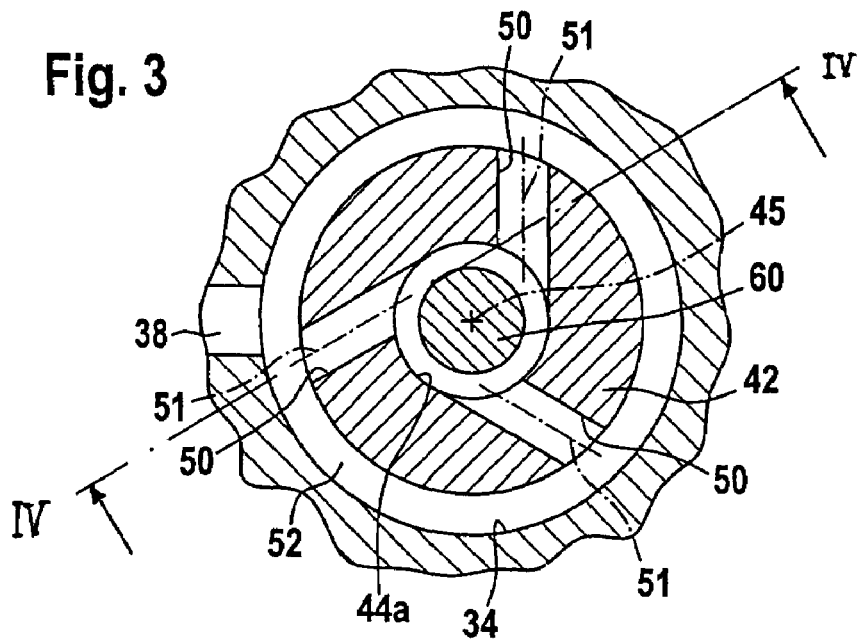
FIG. 3 shows the check valve in a cross section taken along the line 111-111 in FIG. 2.
Figure 4:
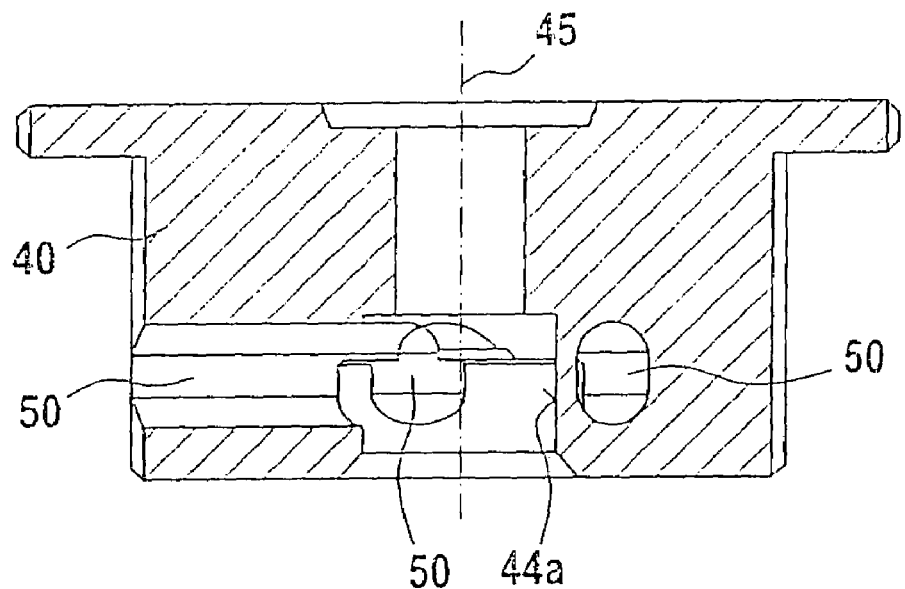
FIG. 4 shows the check valve in a modified version in a section taken along the IV-IV in FIG. 3.

The inlet conduits 50 may be embodied as bores, as is shown in FIGS. 2 and 3. Alternatively, as shown in FIG. 4, the inlet conduits 50 may have a noncircular cross section. The inlet conduits 50 may in particular be embodied such that their width is greater in the direction of the longitudinal axis 45 of the bore 44 than perpendicular to the longitudinal axis 45, as is shown in FIG. 4. The inlet conduits 50 can be made with this cross-sectional shape for instance by beginning with a bore and eroding the noncircular cross section. The end region of the inlet conduits 50 is preferably rounded, as shown in FIG. 4, where they discharge into the bore 44. The embodiment described above of the at least one inlet conduit 50 is independent of the one-piece embodiment of the valve housing 40 and can also be employed in arbitrary other versions of the valve housing 40, including multi-part versions.

The inlet valve 30 has a pistonlike valve member 60, which is guided displaceably with a shaft 62 in the bore portion 44b and which with the end region of the shaft 62 protrudes out of the bore portion 44b into the recess 41 of the valve housing 40. An extension 43 protruding into the recess 41 can project from the bottom 42, in order to assure a great length of the bore portion 44 and thus good guidance of the shaft 62 of the valve member 60. On its end region facing away from the shaft 62, the valve member 60 has a closing body 64 that is larger in diameter than the shaft 62. The valve member 60 has a constriction in a region 66 located in the bore portion 44a, between the closing body 64 and the shaft 62. The constricted region 66 of the valve member 60 is preferably in rounded form. At the transition to the constricted region 66, a sealing face 68 is embodied on the closing body 64 and may for instance be embodied conically.

A closing spring 70 is located in the recess 41 of the valve housing 40 and is braced on one end on the inside of the bottom 42 and on the other on the valve member 60 via a spring plate 72. An annular groove 74 is made in the end region of the shaft 62 of the valve member 60 located in the recess 41 of the valve housing 40, and a resilient securing ring 76 is snapped into the annular groove and thereby retains the spring plate 72. By means of the prestressed closing spring 70, the valve member 60 is urged in its closing direction, in which it comes to rest with its sealing face 68 on the valve seat 48. The open end of the recess 41 of the valve housing 40 is closed with a cap 78, which is for instance press-fitted into the recess 41.

The valve housing 40 is preferably screwed into the bore 34 of the housing part 36; the valve housing 40 has a male thread and the bore 34 has a female thread. A profile 80 is made on the outer periphery of the recess 41, so that the valve housing 40 can be engaged with a suitable tool for rotation. Sealing between the annular shoulder 33, formed at the transition from the cylindrical bore 22 to the bore 34, and the face end, toward the annular shoulder, of the bottom 42 of the valve housing 40 can be assured by a sealing disk 82 located between the annular shoulder 33 and the bottom 42. When the valve housing 40 is screwed into the bore 34, the sealing disk 82 is deformed elastically or plastically and thereby assures the sealing. The sealing disk may be of plastic or soft metal, such as soft iron or copper. Alternatively, the sealing disk 82 may be omitted; in that case, a narrow, raised sealing edge is embodied on the bottom 42 of the valve housing 40 or on the annular shoulder 33, and when the valve housing 40 is screwed into the bore 34, this edge is deformed elastically or plastically and assures the sealing. In another alternative, the annular shoulder 33 and the face end of the bottom 42 may also be provided with flat sealing faces, which are pressed against one another when the valve housing 40 is screwed into the bore 34. Sealing off of the bore 34 from the outside is effected by means of a sealing ring 84, fastened between the outer jacket of the valve housing 40 and the bore 34, near the outer end of the valve housing 40.

The valve member 60 is urged in its opening direction by the pressure generated by the feed pump 14 and delivered to the bore portion 44a via the inlet regions 50. The area of the valve member 60 urged in the opening direction by the pressure, at the transition to the closing body 64, is greater than the area toward the shaft 62 urged in the closing direction, so that a force is generated that acts in the opening direction on the valve member 60. In the intake stroke of the pump piston 20, a higher pressure, generated by the feed pump 14, prevails in the fuel inlet than in the pump work chamber 24, so that the valve member 60 opens counter to the force of the closing spring 70 and with its sealing face 68 lifts away from the valve seat 48, thus uncovering an annular flow cross section into the pump work chamber 24. The inflow of the fuel from the inlet regions 50 into the bore portion 44a is effected with only slight flow losses, because of the tangential discharge of the inlet regions 50 into the bore portion 44a. The tangential discharge from the inlet regions 50 causes the inflowing fuel to swirl. The outlet of the inlet regions 50 in the bore portion 44a may be rounded. By the rounded embodiment of the constricted region 66 of the valve member 60, an outflow of fuel from the bore portion 44a is also effected through the annular gap between the sealing face 68 of the valve member 60 and the valve seat 48 into the pump work chamber 24. Good filling of the pump work chamber 24 is thus enabled. Possible wear of the sealing face 68 of the valve member 60 and of the valve seat 48 on the valve housing 40 does not lead to any change in the areas of the valve member 60 acted upon by pressure and thus also causes no change in the opening differential pressure of the inlet valve 30. The recess 41 in the valve housing 40 communicates with the annular chamber 52 via the bore 54, so that upon the opening stroke of the valve member 60, fuel positively displaced by the valve member out of the recess 41 can flow into the annular chamber 52, and upon the closing stroke, fuel can flow out of the annular chamber 52 into the recess 41. As a result, fast closure of the inlet valve 30 is attained, and a pressure increase in the recess 41 and an attendant load on the cap 78 are prevented.

Figure 5:
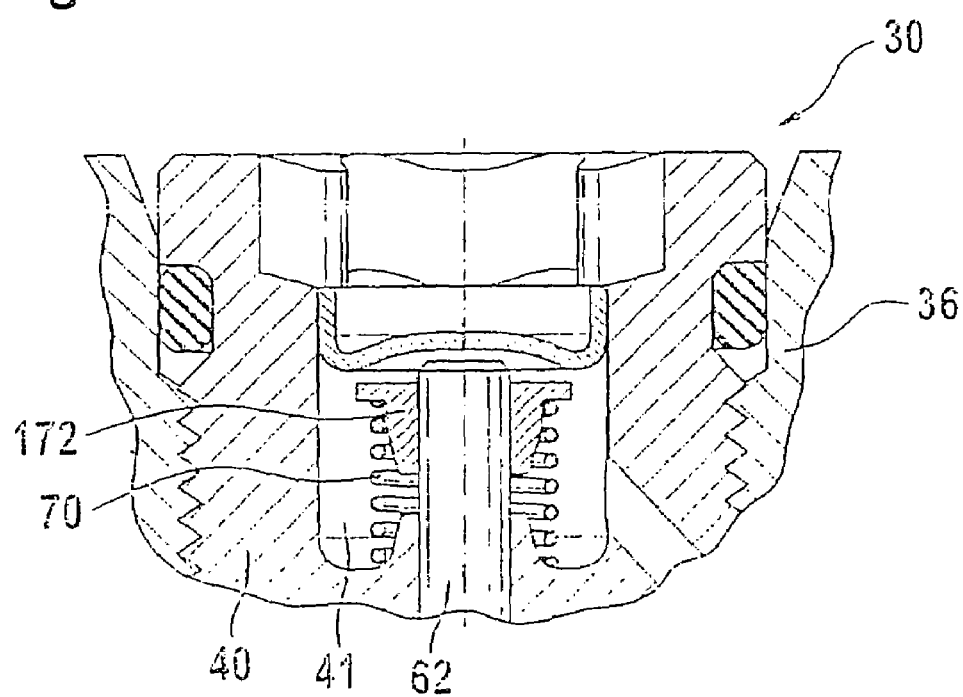
FIG. 5 is a detail of the check valve in a further modified version.

In FIG. 5, the inlet valve 30 is shown in a detail of a modified version compared to the version in FIG. 2. The basic construction of the inlet valve is unchanged; only the embodiment and fastening of the spring plate 172 on the shaft 62 of the valve member 60 is modified. The spring plate 172 is embodied in sleevelike form and is for instance pressed onto the shaft 62 of the valve member 60. In this version, the annular groove 74 and the securing ring 76 that are provided in the version of FIG. 2 can be omitted, so that the structure of the inlet valve 30 is correspondingly simplified.

The foregoing relates to preferred exemplary embodiment of the invention, it being understood that other variants and embodiments thereof are possible within the spirit and scope of the invention, the latter being defined by the appended claims.

The invention claimed is:

1. A check valve for a high-pressure pump of a fuel injection system for an internal combustion engine, comprising a one piece valve housing (40) adapted to be inserted into a receptacle (34) in a pump housing part, a pistonlike valve member (60) guided longitudinally displaceably in the valve housing (40), which valve member cooperates with a valve seat (48) embodied on the valve housing (40), the valve member (60) being urged in the closing direction by a prestressed closing spring (70) and in the opening direction by the pressure prevailing in an inlet (38), the valve member (60) being inserted into the valve housing (40) from the side of the valve seat (48), the valve housing (40) being cup-shaped and having both a bottom (42) and a jacket region that has a recess (41); the valve housing (40) pointing, with the open end of its recess (41), out of the receptacle (34); the valve seat (48) being located on the bottom (42) of the valve housing (40), facing away from the recess (41); the valve member (60) protruding with a shaft (62) through a bore (44b) in the bottom (42) into the recess (41) in which the closing spring (70) is located; and the check valve including at least one inlet conduit (50) extending through the valve housing (40), wherein the at least one inlet conduit (50) discharges at least approximately at a tangent into a bore (44a) surrounding the valve member (60).

2. The check valve according to claim 1, wherein the closing spring (70) is braced on one side on the inside of the bottom (42), pointing into the recess (41), and on the other on a spring plate (72) connected to the shaft (62) of the valve member (60).

3. The check valve according to claim 1, wherein the recess (41) of the valve housing (40) is closed, on its end facing away from the bottom (42), by a cap (78).

4. The check valve according to claim 2, wherein the recess (41) of the valve housing (40) is closed, on its end facing away from the bottom (42), by a cap (78).

5. The check valve according to claim 3, wherein the recess (41) of the valve housing (40) communicates with an inlet region (52) of the check valve (30).

6. The check valve according to claim 4, wherein the recess (41) of the valve housing (40) communicates with an inlet region (52) of the check valve (30).

7. A check valve for a high-pressure pump of a fuel injection system for an internal combustion engine, comprising a one piece valve housing (40) adapted to be inserted into a receptacle (34) in a pump housing part, a pistonlike valve member (60) is guided longitudinally displaceably in the valve housing (40), which valve member cooperates with a valve seat (48) embodied on the valve housing (40), and the valve member (60) being urged in the closing direction by a prestressed closing spring (70) and in the opening direction by the pressure prevailing in an inlet (38). the check valve including at least one inlet conduit (50) extending through the valve housing (40). which at least one inlet conduit discharges in such a way into a bore (44a) surrounding the valve member (60) that the longitudinal axis (51) of the at least one inlet conduit (50) does not intersect the longitudinal axis (45) of the bore (44a) surrounding the valve member (60), wherein the at least inlet conduit (50) discharges at least approximately at a tangent into the bore (44a) surrounding the valve member (60).

8. The check valve according to claim 7, wherein the at least one inlet conduit (50) has a noncircular cross section.

9. The check valve according to claim 7, wherein the valve member (60) has a constriction in its region (66) surrounded by the bore (44a).

10. The check valve according to claim 8, wherein the valve member (60) has a constriction in its region (66) surrounded by the bore (44a).

11. A check valve for a high-pressure pump of a fuel injection system for an internal combustion engine, comprising a one piece valve housing (40) adapted to be inserted into a receptacle (34) in a pump housing part, a pistonlike valve member (60) is guided longitudinally displaceably in the valve housing (40), which valve member cooperates with a valve seat (48) embodied on the valve housing (40), and the valve member (60), being urged in the closing direction by a prestressed closing spring (70) and in the opening direction by the pressure prevailing in an inlet (38), the check valve including at least one inlet conduit (50) extending through the valve housing (40), which at least one inlet conduit discharges in such a way into a bore (44a) surrounding the valve member (60) that the longitudinal axis (51) of the at least one inlet conduit (50) does not intersect the longitudinal axis (45) of the bore (44a) surrounding the valve member (60), wherein the at least one inlet conduit (50) has a noncircular cross section.

12. The check valve according to claim 11, wherein the valve member (60) has a constriction in its region (66) surrounded by the bore (44a).

* * * * *